United States Patent
Motohashi (10) Patent No.: US 9,807,321 B2
(45) Date of Patent: Oct. 31, 2017

(54) IMAGING DEVICE (71) Applicant: SMK Corporation, Tokyo (JP)

(72) Inventor: Kazutaka Motohashi, Chiba (JP)

(73) Assignee: SMK Corporation, Tokyo (JP)

( * ) Notice: Subject to any disclaimer, the term of this patent is extended or adjusted under 35 U.S.C. 154(b) by 279 days.

(21) Appl. No.: 14/806,592

(22) Filed: Jul. 22, 2015

(65) Prior Publication Data
US 2016/0173791 A1 Jun. 16, 2016

(30) Foreign Application Priority Data
Dec. 12, 2014 (JP) .................... 2014-251418

(51) Int. Cl.
H04N 5/353 (2011.01)
H04N 5/374 (2011.01)
H04N 5/376 (2011.01)

(52) U.S. Cl.
CPC ............ H04N 5/353 (2013.01); H04N 5/374 (2013.01); H04N 5/3765 (2013.01)

(58) Field of Classification Search
CPC ....... H04N 5/353; H04N 5/374; H04N 5/3765
See application file for complete search history.

(56) References Cited

U.S. PATENT DOCUMENTS

2006/0001748 A1* 1/2006 Kamon ............ H04N 5/35509
  348/234
2014/0253792 A1* 9/2014 Watanabe ............ H04N 5/2353
  348/362

FOREIGN PATENT DOCUMENTS

| JP | 2005-301518 A | 10/2005 |
| JP | 2007-161189 A | 6/2007 |
| JP | 2009-278496 A | 11/2009 |

* cited by examiner

Primary Examiner — Huy T Nguyen (57) ABSTRACT

An imaging device that reliably images an object flashing at a period closely analogous to an output period of a moving image within a certain period is provided. A first common frame image, which is synthesized from pixel signals produced by photoelectric conversion elements arranged in row selection lines from a second start row selection line to an end row selection line, is extracted from a first frame image synthesized by an image sensor starting at a first start row selection line. As a moving image, a sequence of the first common frame images and second frame images synthesized by the image sensor starting at the second start row selection line is produced. Due to the phase difference between an imaging period of the first common frame image and an imaging period of the second frame image, a flashing object is captured in any of the frame images.

4 Claims, 4 Drawing Sheets

IMAGING DEVICE

CROSS REFERENCE TO RELATED APPLICATION

The contents of the following Japanese patent application are incorporated herein by reference, NO. 2014-251418 filed on Dec. 12, 2014.

FIELD

The present invention relates to an imaging device that outputs with a predetermined output period a moving image produced on the basis of frame images captured by an image sensor. In particular, the present invention relates to an imaging device that differs an imaging period of the frame images with a switching period longer than the output period of the moving image.

BACKGROUND

In recent years, a drive recorder provided with a data storage is installed in automobiles to continuously record images captured by an image sensor. The drive recorder records video information around the automobile. The video information recorded on the data storage is reproduced afterward for use in analysis of the cause of a traffic accident and the like. A moving image recorded on the drive recorder is generally reproduced at an output frequency of 29.97 Hz adhering to the NTSC standard on a monitor or the like. For this reason, the image sensor captures one frame image at a frame frequency that is synchronized with the output frequency of the moving image.

On the other hand, in terms of energy saving, improvement in visibility and the like, LEDs (light emitting diodes) are widely used in traffic light machines. The LEDs used in the traffic light machine flash at a frequency twice as high as the frequency of a utility alternating current power supply of an installation area. For example, the frequency of the utility alternating current power supply is 60 Hz in western Japan, so that the LEDs of the traffic light machine installed in the western Japan flash at a frequency of 120 Hz.

Figure 4:
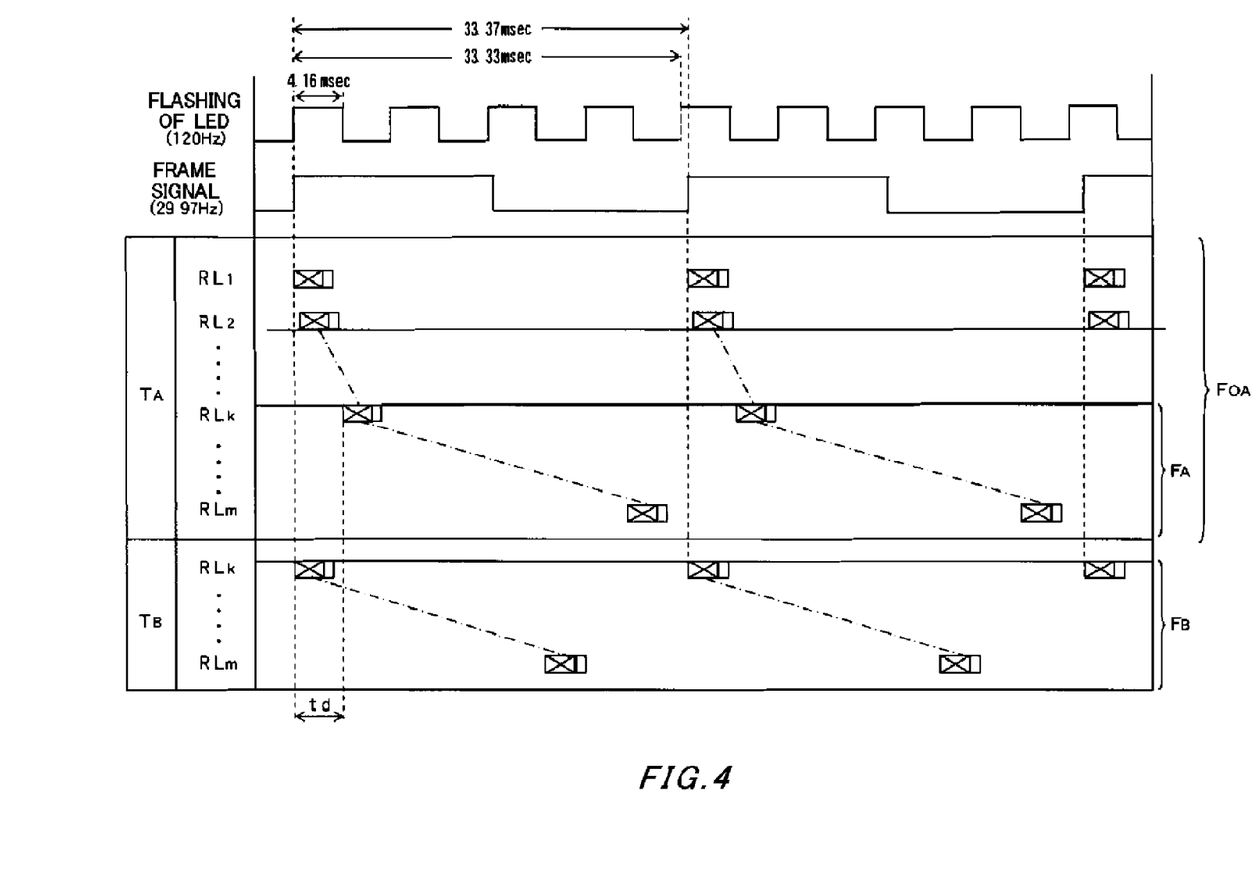
FIG. 4 is a timing chart showing a flashing period of LEDs and imaging periods of a first frame image $F_{OA}$ and a second frame image $F_B$ in comparison with each other.

Here, if the frame images are captured at a frame frequency of 29.97 Hz in synchronization with the output frequency 29.97 Hz for one frame image of the imaging device, as shown in FIG. 4, an imaging period is approximately a four times multiple of the flashing period of the LEDs and sometimes coincides with the turn-off timing of the LEDs for a certain period of time. In this case, therefore, the drive recorder cannot record which color of the traffic light machine is turned on for the certain period of time.

Thus, according to an imaging device of Patent Literature 1, a first field image is captured every field, and a second field image is captured after time of a one-fourth period of the frequency of the utility alternating current power supply has elapsed since the first field image is captured. By adding the captured first and second field images, one frame image is produced. The frame images are sequentially produced, and outputted as a moving image in the NTSC Format.

Also, in an imaging device of Patent Literature 2, the image sensor is exposed at a sufficiently lower frequency than the frequency of the utility alternating current power supply, i.e. for longer time than turn-off time in the flashing period of the LEDs, to capture one frame image. According to this conventional imaging device, the imaging period necessarily includes a turn-on duration in which the LEDs are turned on, so that it is possible to reliably record a state of turning on the traffic signal.

Furthermore, according to an imaging device of Patent Literature 3, the imaging period with which the image sensor captures images is out of synchronization with the flashing period of the LEDs of the traffic light machine, so that the LEDs of the traffic light machine that are turned on are reliably imaged within a certain period of time.

CITATION LIST

Patent Literature

Patent Literature 1: Japanese Patent Application Laid-Open No. 2009-278496
Patent Literature 2: Japanese Patent Application Laid-Open No. 2007-161189
Patent Literature 3: Japanese Patent Application Laid-Open No. 2005-301518

SUMMARY

Technical Problem

According to the conventional imaging device described in Patent Literature 1, the second field image is captured after time of a one-fourth period of the frequency of the utility alternating current power supply has elapsed since the first field image is captured. However, the frequency of the utility alternating current power supply is different between eastern Japan and the western Japan, and hence it is necessary to adjust the timing of capturing the second field image, depending on an area in which the imaging device is used. Therefore, this imaging device cannot be used in the drive recorder installed in the automobiles.

Also, since the second field image, which is out of phase in imaging of the first field image, has to be synchronized with the output timing in the NTSC format after all, a delay circuit is needed to pass the second field image therethrough. Its timing control is difficult and an extra circuit is required.

According to the conventional imaging device described in Patent Literature 2, since the exposure time of the image sensor is long, severe flicker occurs in the reproduced moving image. To make the imaging period longer than the turn-off period of the LEDs and shorter than the output period of the moving image, exposure timing control becomes complicated.

Furthermore, since the exposure time of the image sensor is longer than the turn-off time of the LEDs, the moving image cannot be captured at high speed, and a move of an object moving at high speed, such as the automobiles, cannot be recorded. For example, the turn-off time of the LEDs flashing at 120 Hz is approximately 4.17 msec, so that the exposure time of the image sensor is at least 4.17 msec or more. If the object, for example, an automobile is moving at 100 km/h, the object moves approximately 27.8 m within the exposure time of the one frame image. The drive recorder using such an imaging device cannot be used for accident investigation such as a traffic accident.

According to the conventional imaging device described in Patent Literature 3, the imaging period is out of synchronization with the output period of the moving image adhering to the NTSC standard. This brings a feeling of strangeness in reproduction of the moving image, and requires a specific display device or conversion device.

The present invention has been made with considering such conventional problems, and an object of the present invention is to provide an imaging device that reliably images an object flashing with a period closely analogous to an output period of a moving image within a certain period of time with the use of an existing image sensor and circuit elements.

Solution to Problem

To achieve the above object, in a first aspect of the present invention, an imaging device includes: a plurality of photoelectric conversion elements arranged in a matrix at intersections of a plurality of row selection lines and a plurality of column selection lines crossing at right angles on a substrate: a horizontal scanning circuit for sequentially selecting each of the row selection lines from a start row selection line at one end of the substrate to an end row selection line at the other end of the substrate to perform line exposure of all of the photoelectric conversion elements arranged in the selected row selection line, to thereby cause each of the photoelectric conversion elements to produce a photoelectric converted pixel signal; a vertical scanning circuit for sequentially selecting each of the plurality of column selection lines while the horizontal scanning circuit selects any of the row selection lines to read out the pixel signal of the photoelectric conversion element disposed at an intersection between the selected row selection line and the selected column selection line, the horizontal scanning circuit and the vertical scanning circuit selecting all of the row section lines and the column selection lines by a progressive method in each frame period in synchronization with an output period of a moving image; an image sensor for producing a frame image by synthesizing the pixel signals which are read out of the respective photoelectric conversion elements disposed at the intersections of all the selected row selection lines and all the selected column selection lines; moving image production section for producing the moving image on the basis of a sequence of the frame images which are sequentially synthesized in each frame period; and moving image output section for outputting the moving image with a predetermined output period, wherein the horizontal scanning circuit selects as the start row selection line one of a first start row selection line and a second start row selection line, which is disposed between the first start row selection line and the end row selection line, with a switching period longer than the output period in an alternate manner at a start time in synchronization with the frame period, and the moving image production section extracts a first common frame image, which is synthesized from the pixel signals that the photoelectric conversion elements arranged in the row selection lines from the second start row selection line to the end row selection line produce by photoelectric conversion, from a first frame image synthesized by the image sensor in each frame period with the first start row selection line set as the start row selection line, and produces the moving image, which is a sequence of the first common frame image and second frame images synthesized by the image sensor in each frame period with the second start row selection line set as the start row selection line.

Each of the first common frame image extracted from the first frame image and the second frame image is synthesized from the pixel signals that the common photoelectric conversion elements arranged from the second start row selection line to the end row selection line produce by the photoelectric conversion. The first common frame image delays in phase from the second frame image within the one frame period by time elapsed from the selection of the first start row selection line till the selection of the second start row selection line in the progressive method, so that the moving image output section outputs the moving image in which the first common frame images and the second frame images, which are captured with the same imaging area with the imaging period having the different phases, are alternately continued with the switching period longer than the output period of the moving image.

In a second aspect, in addition to the first aspect, the imaging device according to the present invention is configured such that the image sensor images a light emitter flashing in synchronization with a frequency of a utility alternating current power supply, and the moving image output section outputs the moving image with the output period closely analogous to an integral multiple of a flashing period of the light emitter.

Since the imaging timing of the first common frame image and the imaging timing of the second frame image are out of phase with each other, one of the first common frame image and the second frame image is likely to be out of a turn-on period or a turn-off period of the light emitter flashing in synchronization with the frequency of the utility alternating current power supply.

In a third aspect, in addition to the second aspect, the imaging device according to the present invention is configured such that a phase difference between the first common frame image and the second frame image is approximately ½ of the flashing period of the light emitter.

If the phase difference between the first common frame image and the second frame image is approximately ½ of the flashing period of the light emitter, both of the first common frame image and the second frame image are not captured within the turn-off period of the light emitter.

In a fourth aspect, in addition to the third aspect, the imaging device according to the present invention is configured such that the light emitter is a light emitting diode of a traffic light machine flashing at a frequency of 120 Hz.

Even if the frame period is synchronized with the output period of the moving image adhering to the NTSC standard and closely analogous to an integral multiple of the flashing period of the light emitting diode flashing at a frequency of 120 Hz, any of the first common frame image and the second frame image includes the image of the traffic light machine in a turn-on duration of the light emitting diode.

According to the invention of the first aspect, the imaging device that images the object at different imaging timing can be obtained just by changing the start row selection line selected at the beginning by the horizontal scanning circuit in each switching period, without changing the existing image sensor and circuit elements. Therefore, even if the object flashes with a constant period, the moving image that includes images in both of a turn-on state and a turn-off state can be produced by simple timing control by means of a timing control circuit.

According to the invention of the second aspect, even if the frame period in synchronization with the output period of the moving image is closely analogous to the integral multiple of the flashing period of the light emitter flashing in synchronization with the frequency of the utility alternating current power supply, since the imaging timing of the first common frame image and the imaging timing of the second frame image are out of phase with each other, any of the frame images includes the image of the light emitter in the turn-on state or the turn-off state. The phases of the first common frame image and the second frame image are easily adjustable by changing the row selection line to be set as the second start row selection line.

According to the invention of the third aspect, both of the first common frame image and the second frame image are not captured in the turn-off period of the light emitter, resulting in reliably imaging the turn-on state.

According to the invention of the fourth aspect, the imaging device of a drive recorder that outputs the moving image adhering to the NTSC standard can reliably image the turn-on state of the light emitting diode of the traffic light machine driven by the utility alternating current power supply in the western Japan.

DESCRIPTION OF EMBODIMENTS

An imaging device 1 according to an embodiment of the present invention is installed in a drive recorder of an automobile. The imaging device 1 produces a moving image from a sequence of frame images that are produced by imaging a forward view from a driver's seat in each frame period, and outputs the produced moving image at an output frequency of 29.97 Hz adhering to the NTSC (national television system committee) standard to a monitor or a recording device. The moving image is used for an investigation of the cause of an accident or the like.

Figure 1:
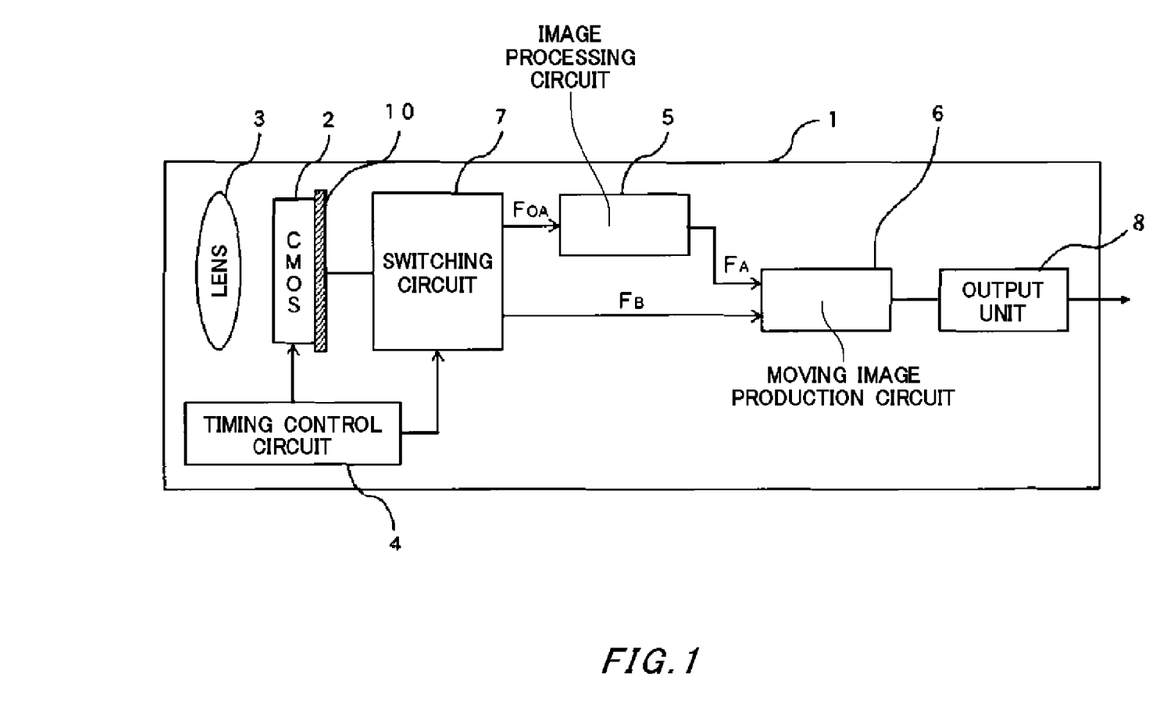
FIG. 1 is a block diagram of an imaging device 1 according to an embodiment of the present invention.

FIG. 1 shows the structure of this imaging device 1. The imaging device 1 includes: an image sensor 2 for imaging the forward view from the driver's seat of the automobile and outputting the frame image in each frame period as described later; a lens 3 for forming an image of the forward view from the driver's seat of the automobile on a circuit substrate 10 in which the image sensor 2 is mounted; a timing control circuit 4 for controlling the imaging timing of the image sensor 2 and the switching timing of a switching circuit 7; an image processing circuit 5; a moving image production circuit 6; and an output unit 8 for outputting the moving image produced by the moving image production circuit 6 at the output frequency of 29.97 Hz.

Figure 2:
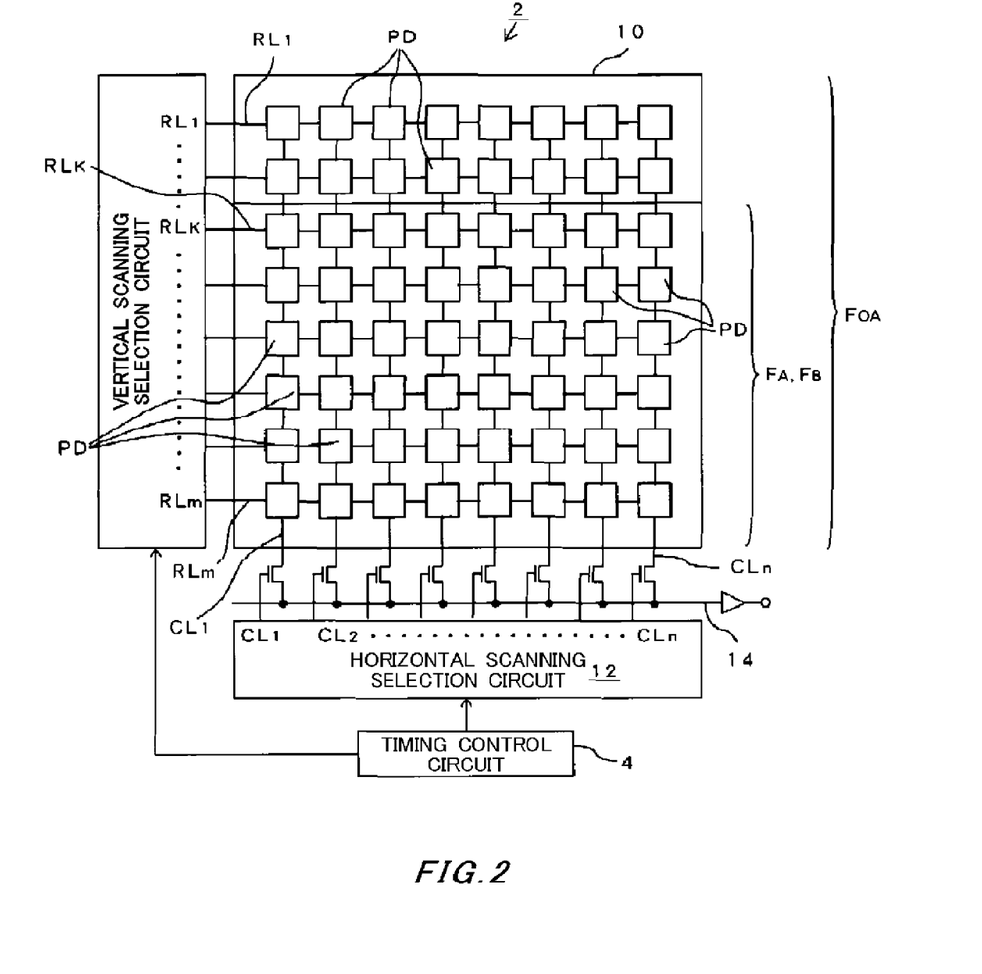
FIG. 2 is an explanatory view showing the schematic structure of an image sensor 2.

As shown in FIG. 2, the image sensor 2 is an X-Y address type CMOS (complementary metal oxide semiconductor) image sensor. The image sensor 2 includes a number of photoelectric conversion elements PD arranged in a matrix in a light receiving surface of the circuit substrate 10, a number of row selection lines RL, a number of column selection lines CL, a vertical scanning selection circuit 11, and a horizontal scanning selection circuit 12. Each photoelectric conversion element PD performs photoelectric conversion of light, such as light passing through the lens 3. Each row selection line RL connects the photoelectric conversion elements PD aligned in a horizontal direction. Each column selection line CL connects the photoelectric conversion element PD aligned in a vertical direction. The vertical scanning selection circuit 11 and the horizontal scanning selection circuit 12 perform selection operation on the basis of a selection control signal outputted from the timing control circuit 4. Here, the photoelectric conversion elements PD, composed of 1024×740 photodiodes i.e. horizontally arranged 1024 photodiodes (n=1024) by vertically arranged 740 photodiodes (m=740), are disposed at intersections of the 740 row selection lines RL and the 1024 column selection lines CL arranged in the circuit substrate 10, on a one-by-one basis.

The lens 3 forms an object image of the forward view from the driver's seat in an area in which the row selection lines RL from a row selection line RLk, which is set as a start row selection line in an after-mentioned TB mode, to an end row selection line RLm are arranged. In this embodiment, as shown in FIG. 2, a moving image of the object images is produced from a first common frame image $F_A$ and a second frame image $F_B$ into which image signals of the photoelectric conversion elements PD arranged in this area are synthesized. In general, the CMOS image sensor 2 has auxiliary photoelectric conversion elements PD arranged around the area for actual use in production of the frame image. Thus, in this embodiment, as described later, the auxiliary photoelectric conversion elements PD arranged in an area from a topmost row selection line RL1 to a row selection line RLk−1 are used for producing the phase difference in imaging time between the first common frame image $F_A$ and the second frame image $F_B$.

In the CMOS image sensor 2, the photoelectric conversion elements PD, which are disposed at the intersections of the row selection lines RL and the column selection lines CL, are sequentially exposed in a progressive method in one frame period in synchronization with the output frequency of 29.97 Hz of the moving image. The CMOS image sensor 2 produces the one frame image by synthesizing pixel signals read out of the photoelectric conversion elements PD that have performed the photoelectric conversion.

Figure 3:
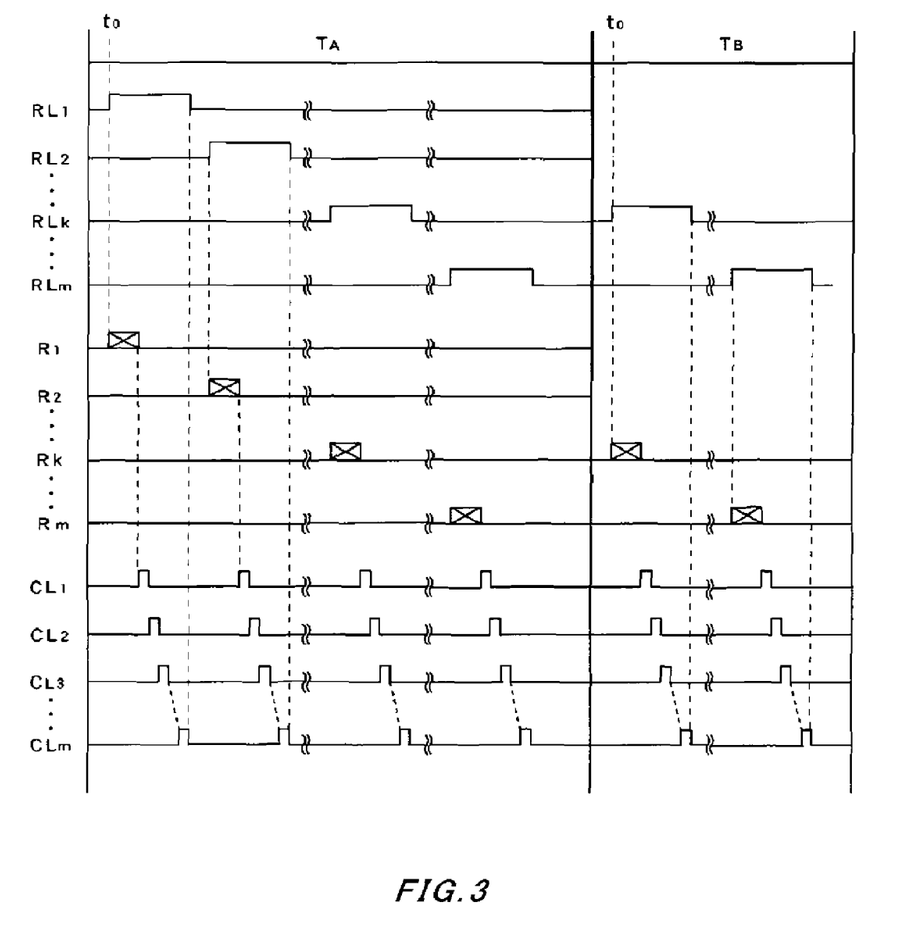
FIG. 3 is a timing chart showing the selection timing of each row selection line RL and each column selection line CL in reading out a number of pixel signals constituting an image signal of one frame image.

The operation for producing the one frame image will hereinafter be described in more detail. As shown in FIG. 3, the vertical scanning selection circuit 11 selects at t0 in synchronization with the one frame period the row selection line RL (the row selection line RL1 in a TA mode of FIG. 3) arranged in an upper part, which is arbitrarily selectable from the many row selection lines RL, as the start row selection line. Then, the vertical scanning selection circuit 11 sequentially selects the row selection lines RL arranged therebelow, so as to sequentially select all of the row selection lines RL up to the arbitrarily set end row selection line (the row selection line RLm in the TA mode of FIG. 3) until the frame period ends. As shown in FIG. 3, while the vertical scanning selection circuit 11 selects any of the row selection lines RL, all of the photoelectric conversion elements PD arranged along the selected row selection line RL are exposed by line exposure for exposure time indicated by a sign of a rectangle having diagonal lines therein in FIGS. 3 and 4.

Each photoelectric conversion element PD has a not-shown capacitor for accumulating a signal charge produced by the photoelectric conversion of the photoelectric conversion element PD. A reset signal outputted from the vertical scanning selection circuit 11 to the row selection line RL triggers release of the signal charge accumulated in the capacitor. A row transfer signal outputted from the vertical scanning selection circuit 11 to the row selection line RL triggers transfer of the signal charge produced by the photoelectric conversion of the photoelectric conversion elements PD to the capacitor. In other words, the exposure time of all of the photoelectric conversion elements PD arranged along the selected row selection line RL corresponds to the time from an output of the reset signal to the row selection line RL till an output of the row transfer signal thereto. The signal charge corresponding to the amount of light received by the photoelectric conversion element PD during the exposure time is accumulated in the capacitor of the photoelectric conversion element PD, so that a signal potential between both ends of the capacitor becomes the pixel signal representing the amount of received light.

When the vertical scanning selection circuit 11 outputs the row transfer signal to any selected row selection line RL, as shown in FIG. 3, the horizontal scanning selection circuit 12 outputs a column selection signal, to sequentially select every column selection line CL from a leftmost column selection line CL1 to a rightmost column selection line CLn in the drawing from left to right. As shown in FIG. 2, a column selection transistor 13 is connected between the horizontal scanning selection circuit 12 and each column selection line CL. Upon outputting the column selection signal from the horizontal scanning selection circuit 12, the capacitor of the photoelectric conversion element PD connected to the selected column selection line CL is connected to an output line 14. Thus, a pixel signal of the photoelectric conversion element PD that is disposed at the intersection of the row selection line RL to which the row transfer signal is outputted and the column selection line CL to which the horizontal scanning selection circuit 12 outputs the column selection signal is outputted to the output line 14 in synchronization with the output of the column selection signal from the horizontal scanning selection circuit 12.

Likewise, the pixel signals of all of the photoelectric conversion elements PD disposed at the intersections of the row selection lines RL and the column selection lines CL are outputted to the output line 14 by the progressive method. The CMOS image sensor 2 synthesizes the pixel signals of all of the photoelectric conversion elements PD in each frame period, and produces the frame image that represents the object image formed in an arrangement area of the selected row selection lines RL and the column selection lines CL.

The frame images are produced by the CMOS image sensor 2 at a frame signal frequency of 29.97 Hz in synchronization with the output frequency of 29.97 Hz of the moving image, being a sequence of the frame images, from the output unit 8, and thus in a frame period of approximately 33.37 msec for producing the one frame image. As shown in FIG. 4, the timing control circuit 4 outputs a timing control signal to the vertical scanning selection circuit 11 and the horizontal scanning selection circuit 12 to control the output timing of the reset signal, the row transfer signal, the column selection signal, and the like outputted from the vertical scanning selection circuit 11 and the horizontal scanning selection circuit 12 so that all of the row selection lines RL from the topmost row selection line RL1 to the bottommost end row selection line RLm are selected in 30.85 msec, which is shorter than the one frame period of approximately 33.37 msec, and the frame image is synthesized from the pixel signals of all of the photoelectric conversion elements PD arranged in the respective row selection lines RL.

In this embodiment, the imaging device 1 operates in any operation mode of the TA mode and the TB mode alternately switched with a switching period of approximately 500.5 msec, which is sufficiently longer than the output period (1/29.97 Hz i.e. approximately 33.37 msec) of the moving image, with setting a start of the one frame period at t0 at which the start row selection line is first selected. As shown in FIG. 3, in the TA mode, the topmost row selection line RL1 is set as the start row selection line. In the TB mode, the row selection line RLk disposed below the row selection line RL1 (here, the row selection line RL100 being the hundredth row selection line downward from the topmost) is set as the start row selection line.

More specifically, in the TA mode, as shown in FIG. 4, the row selection line RL1 is selected at the start t0 of the one frame period, and the row selection lines RL from the row selection line RL1 to the row selection line RLm, being the end row selection line, are sequentially selected in the same frame period. Then, the CMOS image sensor 2 produces the first frame image $F_{OA}$, being the object image formed in an area from the row selection line RL1 to the row selection line RLm on the circuit substrate 10. After the first frame images $F_{OA}$ are produced in a like manner fifteen times in sequence, the operation mode is switched from the TA mode to the TB mode with the switching period of approximately 500.5 msec.

In the TB mode, as shown in FIG. 4, the row selection line RLk (k=100 in this embodiment) is selected at the start t0 of the one frame period, and the row selection lines RL from the row selection line RLk to the row selection line RLm, being the end row selection line, are sequentially selected in the same frame period. Then, the CMOS image sensor 2 produces the second frame image $F_B$, being the object image formed in an area from the row selection line RLk to the row selection line RLm on the circuit substrate 10. After the second frame images $F_B$ are produced in a like manner fifteen times in sequence, the operation mode is switched again from the TB mode to the TA mode with the switching period of approximately 500.5 msec. This operation is repeated thereafter.

The first frame images $F_{OA}$ or the second frame images $F_B$ are inputted alternately in each switching period to the switching circuit 7 connected to an output of the CMOS image sensor 2. The timing control circuit 4 outputs to the vertical scanning selection circuit 11 a mode switching signal for switching the operation mode of the vertical scanning selection circuit 11 between the TA mode and the TB mode in synchronization with the switching period, and also outputs the mode switching signal to the switching circuit 7. Thus, using the mode switching signal, the switching circuit 7 outputs the frame images inputted from the CMOS image sensor 2 to the image processing circuit 5 in a case where the frame images are the first frame images $F_{OA}$, and outputs the frame images to the moving image production circuit 6 in a case where the frame images are the second frame images $F_B$.

The image processing circuit 5 removes the pixel signals outputted from the photoelectric conversion elements PD arranged in the area from the row selection line RL1 to the row selection line RLk−1, being the next above line of the row selection line RLk, from the first frame image $F_{OA}$, and synthesizes the first common frame image $F_A$ from the pixel signals of the photoelectric conversion elements PD arranged in the row selection lines RL from the row selection line RLk to the row selection line RLm. The first common frame image $F_A$ is then outputted to the moving image production circuit 6.

While the CMOS image sensor 2 operates in the TA mode, the first common frame image $F_A$ is inputted from the image processing circuit 5 to the moving image production circuit 6. While the CMOS image sensor 2 operates in the TB mode, the second frame image $F_B$ is directly inputted from the CMOS image sensor 2 to the moving image production circuit 6. Both of the first common frame image $F_A$ and the second frame image $F_B$ are composed of the image signals that are produced by capturing the object images formed in the same area from the row selection line RLk to the row selection line RLm on the circuit substrate 10. Thus, if the moving image is produced by making the first common frame image $F_A$ and the second frame image $F_B$ follow each other at each switching period, the moving image can be seen without feeling of strangeness, because the position of the object does not change in the moving image.

Here, in the TA mode, since the row selection lines RL from the topmost row selection line RL1 to the bottommost row selection line RLm are sequentially selected and scanned in approximately 30.85 msec within the one frame period, the time of selecting the lower row selection line RLk delays by time td from the time of selecting the topmost row selection line RL1, as shown in FIG. 4. For example, in the TA mode of this embodiment, the 740 row selection lines RL from the row selection line RL1 to the row selection line RLm, being the end row selection line, are selected and scanned in approximately 30.85 msec, so that the time td from the start time t0 at which the topmost row selection line RL1 is selected to the time of selecting the hundredth row selection line RLk (k=100) is approximately 4.17 msec. That is to say, the imaging period of the first common frame image $F_A$, which is synchronized with each frame signal, delays by approximately 4.17 msec relative to the imaging period of the second frame image $F_A$.

On the other hand, as shown in FIG. 4, LEDs of a traffic light machine operated by an utility alternating current power supply of 60 Hz in western Japan flash at a frequency of 120 Hz, and repeat a turn-on duration of approximately 4.17 msec and a turn-off duration of approximately 4.17 msec. In this embodiment, the start row selection line RLk in the TB mode is selected such that scan time in the TA mode from the start row selection line RL1 to the row selection line RLk, being the start row selection line in the TB mode, becomes approximately ½ of the flashing period of the LEDs. Thus, the phase difference between the imaging period of the first common frame image $F_A$ and the imaging period of the second frame image $F_B$ is approximately ½ of the flashing period of the LEDs of the traffic light machine. Accordingly, the LEDs in an ON state are captured in any of the first common frame image $F_A$ and the second frame image $F_B$.

The moving image production circuit 6 produces the moving image by making the first common frame images $F_A$ inputted from the image processing circuit 5 in sequence and the second frame images $F_B$ inputted from the CMOS image sensor 2 follow each other alternately with the switching period of approximately 500.5 msec in synchronization with the frame frequency, and outputs the moving image to the output unit 8. Since the frame frequency of the moving image inputted to the output unit 8 is the same as the output frequency of the 29.97 Hz adhering to the NTSC standard, the output unit 8 can output the moving image outputted from the moving image production circuit 6 to the recording device or a reproduction device adhering to the NTSC standard without changing its frequency. Here, the LEDs in the ON state are necessarily captured in any of the first common frame image $F_A$ and the second frame image $F_B$, constituting the moving image. Therefore, the LEDs of the traffic light machine in the ON state are necessarily imaged within a moving image reproduction period of at least the switching period of approximately 500.5 msec or more, and it is possible to reliably perform an investigation of a traffic accident and the like.

In the above embodiment, the same row selection line RLm is set as the end row selection line in both of the TA mode and the TB mode, but there is no need to make the end row selection line coincide, as long as the image processing circuit 5 removes part of the image signal and the first common frame image $F_A$ and the second frame image $F_B$ are synthesized from the pixel signals of the photoelectric conversion elements PD arranged in the same imaging area.

Also, the row selection line RLk, being the start row selection line in the TB mode, is determined such that the phase difference between the imaging period of the first common frame image $F_A$ and the imaging period of the second frame image $F_B$ is approximately ½ of the flashing period of the LEDs of the traffic light machine, but a desired phase difference in the imaging period can be obtained by adjusting a scan speed of the row selection lines RL by the vertical scanning selection circuit 11 or selecting the start row selection line in the TB mode.

Furthermore, in the embodiment described above, the frame frequency for producing the one frame image coincides with the output frequency for outputting the moving image. However, the present invention is applicable to an imaging device having a frame frequency and an output frequency asynchronous to each other.

The present invention is suitable for an imaging device that images a light emitter flashing at regular intervals.

REFERENCE SIGNS LIST

1 imaging device
2 image sensor
8 output unit (moving image output section)
10 circuit substrate (substrate)
11 vertical scanning selection circuit
12 horizontal scanning selection circuit
$F_{OA}$ first frame image
$F_A$ first common frame image
$F_B$ second frame image
PD photoelectric conversion element
RL row selection line
CL column selection line

The invention claimed is:

1. An imaging device comprising:
   a plurality of photoelectric conversion elements arranged in a matrix at intersections of a plurality of row selection lines and a plurality of column selection lines crossing at right angles on a substrate:
   a horizontal scanning circuit for sequentially selecting each of the row selection lines from a start row selection line at one end of the substrate to an end row selection line at the other end of the substrate to perform line exposure of all of the photoelectric conversion elements arranged in the selected row selection line, to thereby cause each of the photoelectric conversion elements to produce a photoelectric converted pixel signal;
   a vertical scanning circuit for sequentially selecting each of the plurality of column selection lines while the horizontal scanning circuit selects any of the row selection lines to read out the pixel signal of the photoelectric conversion element disposed at an intersection between the selected row selection line and the selected column selection line, the horizontal scanning circuit and the vertical scanning circuit selecting all of the row section lines and the column selection lines by a progressive method at each frame period in synchronization with an output period of a moving image;
   an image sensor for producing a frame image by synthesizing the pixel signals which are read out of the respective photoelectric conversion elements disposed at the intersections of all the selected row selection lines and all the selected column selection lines;

moving image production section for producing the moving image on the basis of a sequence of the frame images which are sequentially synthesized; and moving image output section for outputting the moving image with a predetermined output period, wherein the horizontal scanning circuit selects as the start row selection line one of a first start row selection line and a second start row selection line, which is disposed between the first start row selection line and the end row selection line, with a switching period longer than the output period in an alternate manner at a start time in synchronization with the frame period, and the moving image production section extracts a first common frame image, which is synthesized from the pixel signals that the photoelectric conversion elements arranged in the row selection lines from the second start row selection line to the end row selection line produce by photoelectric conversion, from a first frame image synthesized by the image sensor in each frame period with the first start row selection line set as the start row selection line, and produces the moving image, which is a sequence of the first common frame image and second frame images synthesized by the image sensor in each frame period with the second start row selection line set as the start row selection line.

2. The imaging device according to claim 1, wherein:
the image sensor images a light emitter flashing in synchronization with a frequency of a utility alternating current power supply; and
the moving image output section outputs the moving image at the output period closely analogous to an integral multiple of a flashing period of the light emitter.

3. The imaging device according to claim 2, wherein a phase difference between the first common frame image and the second frame image is approximately ½ of the flashing period of the light emitter.

4. The imaging device according to claim 3, wherein the light emitter is a light emitting diode of a traffic light machine flashing at a frequency of 120 Hz.

* * * * *